United States Patent [19]

Lin et al.

[11] Patent Number: 5,349,485
[45] Date of Patent: Sep. 20, 1994

[54] MAGNETIC TAPE LOADING MECHANISM FOR A MAGNETIC RECORDING AND/OR REPRODUCING APPARATUS

[75] Inventors: Wen-Don Lin; Chyi-Fwu Chiou; Chih-Chung Chu; Pan Ch'un-Hsiu; Ming-Che Chiu, all of Hsinchu, Taiwan

[73] Assignee: Industrial Technology Research Institute, Hsinchu, Taiwan

[21] Appl. No.: 954,866

[22] Filed: Sep. 30, 1992

[51] Int. Cl.$^5$ ............... G11B 5/027; G11B 5/008
[52] U.S. Cl. ............................ 360/85; 360/95
[58] Field of Search .................. 360/85, 95, 96.3

[56] References Cited

U.S. PATENT DOCUMENTS

| | | | |
|---|---|---|---|
| 4,652,947 | 3/1987 | Oka et al. | 360/85 |
| 4,748,521 | 5/1988 | Osawa et al. | 360/85 |
| 4,914,536 | 4/1990 | Yamanak | 360/96.3 |
| 4,951,164 | 8/1990 | Yasaka et al. | 360/85 |
| 4,985,789 | 1/1991 | Kodama et al. | 360/85 |
| 5,025,332 | 6/1991 | Tsuchida et al. | 360/85 |

Primary Examiner—John H. Wolff
Assistant Examiner—David D. Davis
Attorney, Agent, or Firm—W. Wayne Liauh

[57] ABSTRACT

A magnetic tape loading mechanism for a magnetic recording and/or reproducing apparatus is disclosed. The loading mechanism includes a reversible driving motor which can be actuated by signals sent from a positional detector to drive a gear train in order to perform a switching operation of work modes. The gear train includes five actuating gears which are operatively connected to the corresponding members, such as a pair of mounting blocks each having an inclination post and a guide roller provided thereon, a moving post, a tension post and a pinch roller, so that these members can be moved to a predetermined position according to the various time sequences and work modes, to enable the magnetic tape to be led out of a tape cassette located in the apparatus and to be wound around a magnetic head having a magnetic drum, thereby allowing to record or reproduce signals from the magnetic tape.

8 Claims, 9 Drawing Sheets

MAGNETIC TAPE LOADING MECHANISM FOR A MAGNETIC RECORDING AND/OR REPRODUCING APPARATUS

FIELD OF THE INVENTION

This invention relates to a magnetic recording and/or reproducing apparatus, particularly to a magnetic tape loading mechanism for a magnetic recording and/or reproducing apparatus which is capable of leading a magnetic tape out of a tape cassette positioned in the apparatus and enabling the same to be wound around a magnetic head having a rotatable magnetic drum in order to record or reproduce signals from the magnetic tape.

BACKGROUND OF THE INVENTION

In a conventional magnetic recording and/or reproducing apparatus, particularly in a magnetic recording and/or reproducing apparatus having a rotatable magnetic head, the magnetic tape loading mechanism is used to lead a magnetic tape out of a cassette and enable the magnetic tape to be wound onto a rotatable magnetic drum such that information can be recorded on the magnetic tape or reproduced from the magnetic tape by means of the magnetic head. As well known, in a tape-loading process, the magnetic tape has to fulfill the following three conditions such that it may move stably and the magnetic tape loading mechanism may accurately perform various work modes in accordance with a specified time sequence. These conditions include: (a) parallelism condition—the magnetic tape has to move parallel to a datum plane during the period when it is led out of a tape cassette and caused to be wound around a magnetic head; (b) twist condition—there will be no twist when the magnetic tape moves and after it is wound around the magnetic head; and (c) height condition—the center line of the magnetic tape must be maintained at the same height both in the inlet side where the magnetic tape moves toward the inclination post and in the outlet side where the tape moves away from the inclination post. Accordingly, the tape loading mechanism basically includes a moving post and inclination posts for leading a magnetic tape out of a tape cassette and for guiding the tape to move stably, a pinch roller and a capstan shaft for controlling the movement of the magnetic tape, and a tension post for adjusting the tension of the magnetic tape. These members can be actuated to move to the specified positions according to a time sequence set by the unloading, search and stop, and play modes of the magnetic recording and/or reproducing apparatus. However, the known tape loading mechanisms usually comprise a number of links and cam plates or rotating rings, and in each work mode the same link is arranged to simultaneously drive a plurality of post members mentioned above so that these post members can be set in different movement states and moved to different positions to match with various time sequences and work modes. Such a driving method may involve the disadvantages of necessitating a lot of components, a complicate construction, difficulty of design, assembly and maintenance, a higher manufacturing cost, and being easily out of order. Moreover, the overall height of the apparatus is larger as a clearance is required between two links to enable them to be folded on top of another when using links as the driving members. On the other hand, the width, length and thickness of the apparatus will all be increased if the rotating rings are used as driving members, which will not only lead to an increment in the weight of the apparatus but also the difficulty of a compact design.

In view of the aforementioned drawbacks, one object of this invention is to provide a magnetic tape loading mechanism for a magnetic recording and/or reproducing apparatus in which the operational sequence of the moved members can be accurately controlled to enable the same to move smoothly and positively.

Another object of this invention is to provide a magnetic tape loading mechanism for a magnetic recording and/or reproducing apparatus which has an improved movement accuracy and reliability in that the accurate positioning of its moved members can be achieved in a simple and fast manner.

The further object of this invention is to provide a magnetic tape loading mechanism for a magnetic recording and/or reproducing apparatus which is compact in size and simple in construction.

SUMMARY OF THE INVENTION

According to the present invention a magnetic tape loading mechanism for a magnetic recording and/or reproducing apparatus is provided which includes a reversible driving motor and a transmission system having a gear train. The gear train includes five actuating gears which are operatively connected to the left and right mounting blocks each having an inclination post and a guide roller provided thereon, the pinch roller, the moving post and the tension post respectively, and are so arranged as to be sequentially driven to cause these actuated members to move along a preset path to a predetermined position, for enabling a magnetic tape to be led out of a tape cassette located in the apparatus and to be wound around a magnetic drum of the apparatus, so that information recording and/or reproducing operation can be performed on the magnetic tape.

In one aspect the loading mechanism includes a positional detector which is so arranged as to send signals to a controller for actuating and controlling the direction of rotation of the reversible driving motor, so that the corresponding actuated members can be actuated to move according to a work mode set by the signal. The positional detector includes a contact slider which is attached to the underside of a transmission gear of the gear train and is capable of contacting with one of the position sensors located on a base of the apparatus to initiate a work mode when the transmission gear is rotated.

In another aspect the loading mechanism includes a device for regulating the tension of the magnetic tape. The tension adjustment device includes a pair of magnets provided on a pivotable arm having a tension post provided at its free end. Either magnet will energize, depending on the tension of the magnetic tape sensed by the tension post, a magnetic impedance sensor provided on the base, so that a signal is sent to a controller to control the speed of a motor for driving the supply reel of the tape cassette to keep the magnetic tape maintain at a constant tension.

In a further aspect the loading mechanism may include a torsion spring which is interposed between the actuating gear and the actuated member. The torsion spring will apply a rated spring force on the actuated member to maintain the same at a predetermined position after it has been moved to that position, and a stable tape running performance can be achieved.

BRIEF DESCRIPTION OF THE DRAWINGS

The above and other objects, features and advantages of this invention will become more apparent from the following detailed description taken in conjunction with the accompanying drawings, in which.

DETAILED DESCRIPTION OF THE PREFERRED EMBODIMENT

Figure 1:
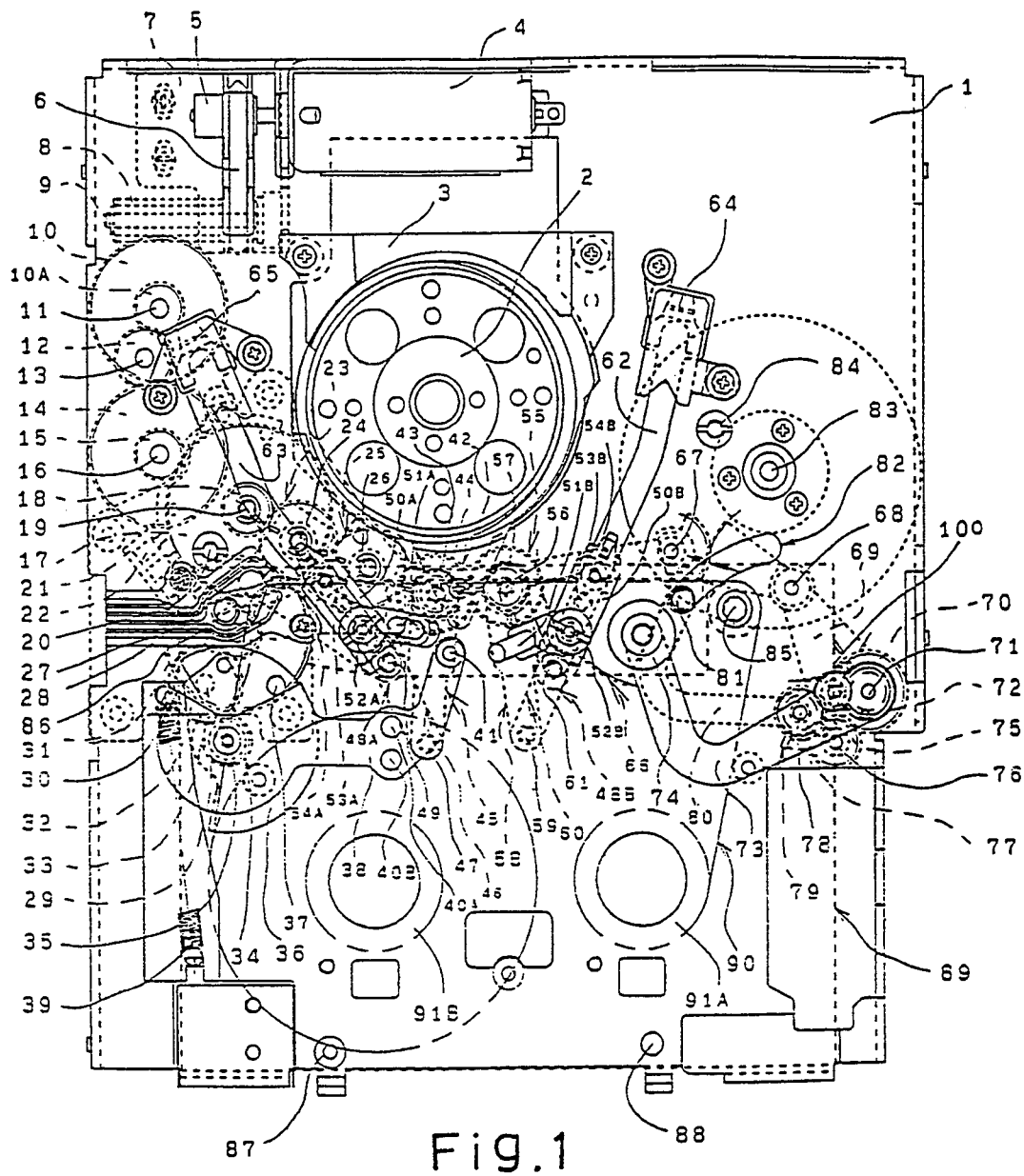
FIGS. 1–3 are plan views of the magnetic tape loading mechanism for a magnetic recording and/or reproducing apparatus of this invention, showing its unloading, search and stop, and play modes respectively.
Figure 2:
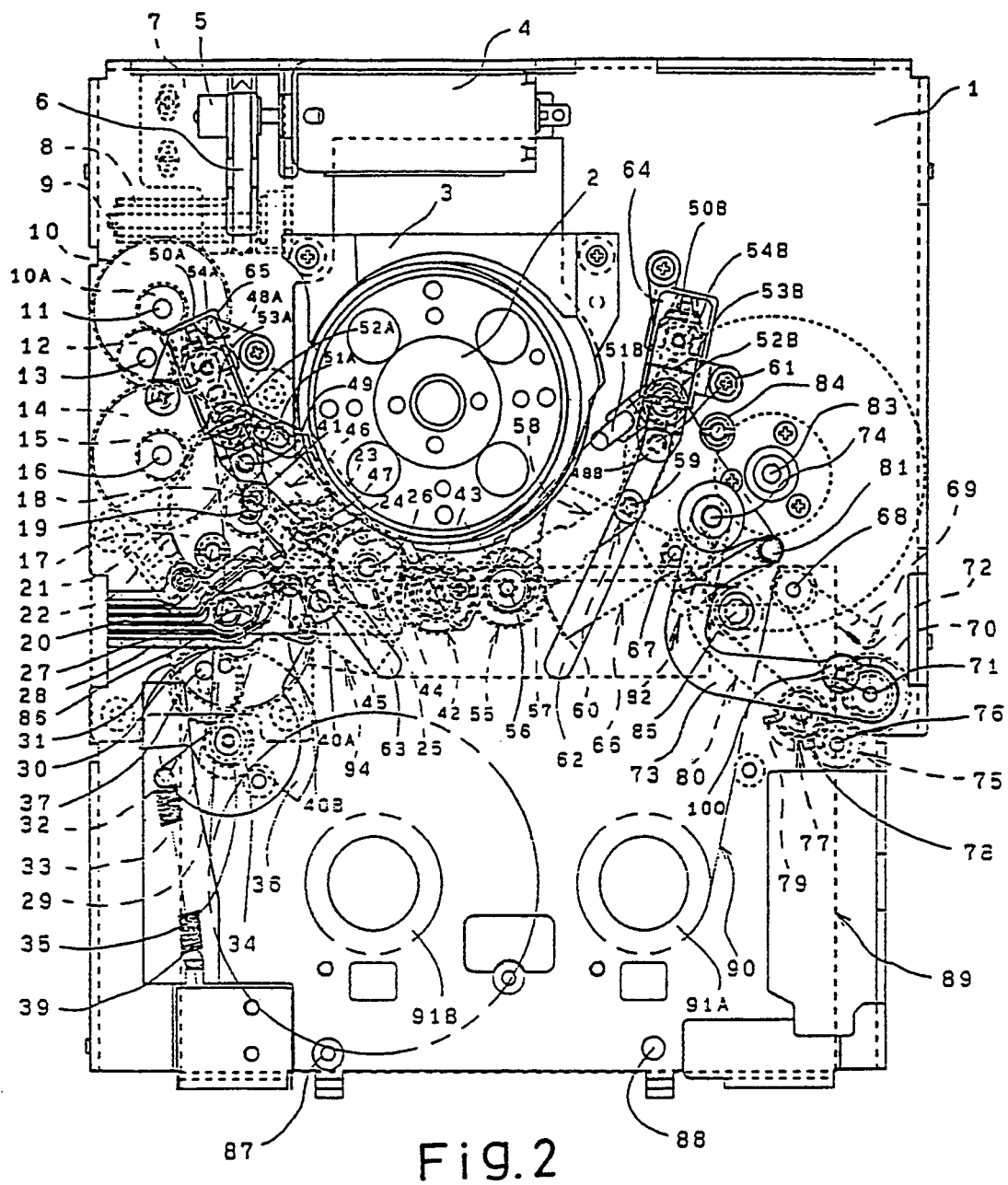
Figure 3:
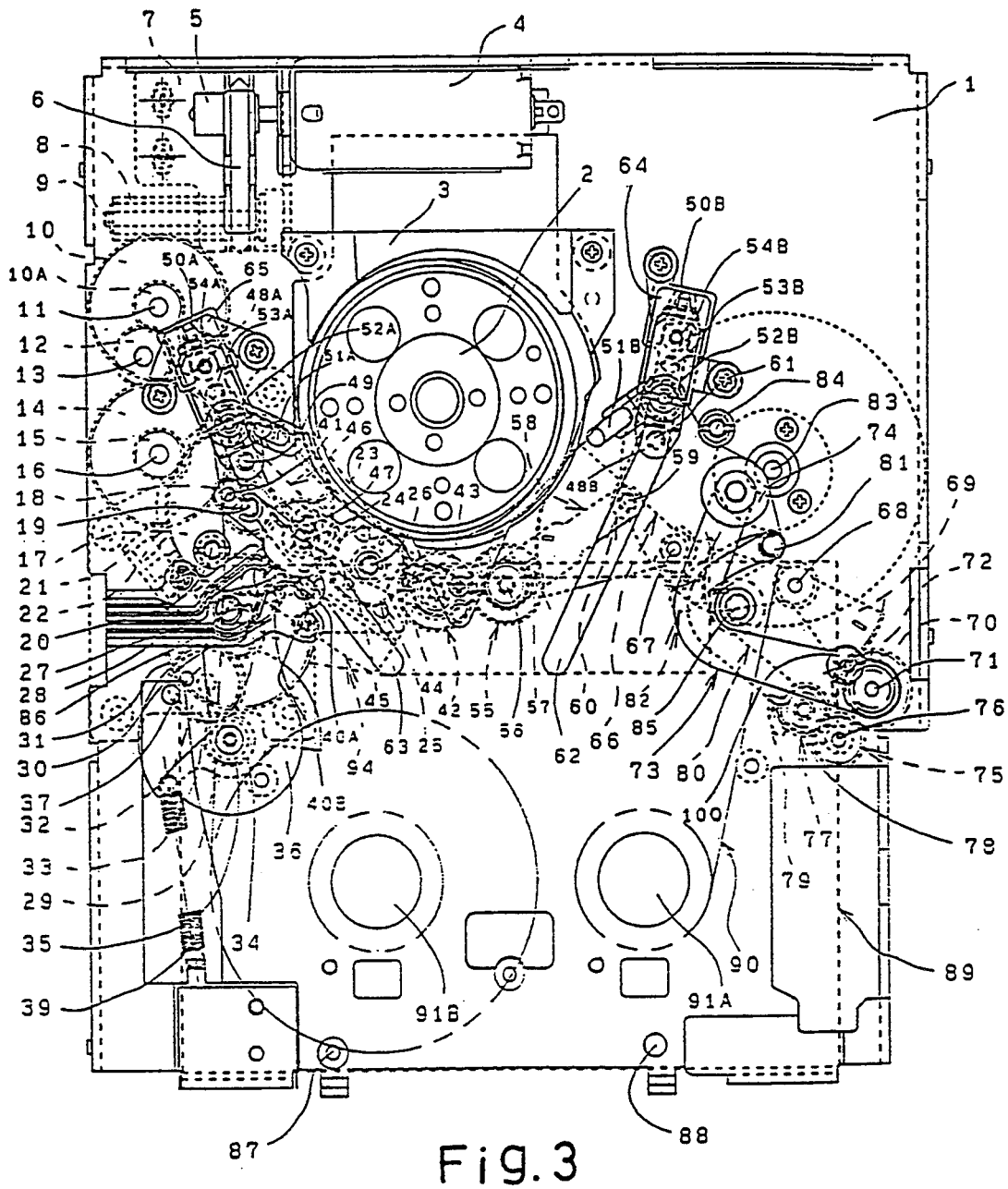

Referring to FIGS. 1–3, there is shown an embodiment of the magnetic recording and/or reproducing apparatus of this invention. The apparatus includes a base 1, a magnetic drum 2 having a magnetic head and rotatably mounted on fixed block 3 fixedly attached on base 1, left and right fixed posts 20 and 84, left and right guide rollers 52A and 52B, left and right inclination posts 51A and 51B, a moving post 81, a pinch roller 74, a capstan shaft 83 and a tension post 41. Inclination posts 51A, 51B and guide rollers 52A, 52B are respectively fixedly and rotatably mounted on the corresponding left and right mounting blocks 50A and 50B which are so arranged as to move along the respective guide slots 63 and 62 formed on base 1 to enable guide rollers 52A, 52B to engage with the corresponding positioning stoppers 65, 64 located at the extreme end of guide slots 63 and 62. Tape cassette positioning posts 85, 86, 87 and 88 are also provided on base 1 to allow the inserted tape cassette 89 to be accurately positioned in the apparatus. Tape cassette 89 has provided therein a supply reel 91B and a take-up reel 91A between which a magnetic tape 90 is stretched and wound therearound. The construction mentioned above is known and similar to conventional apparatus, and a further description is thus omitted.

Figure 4:
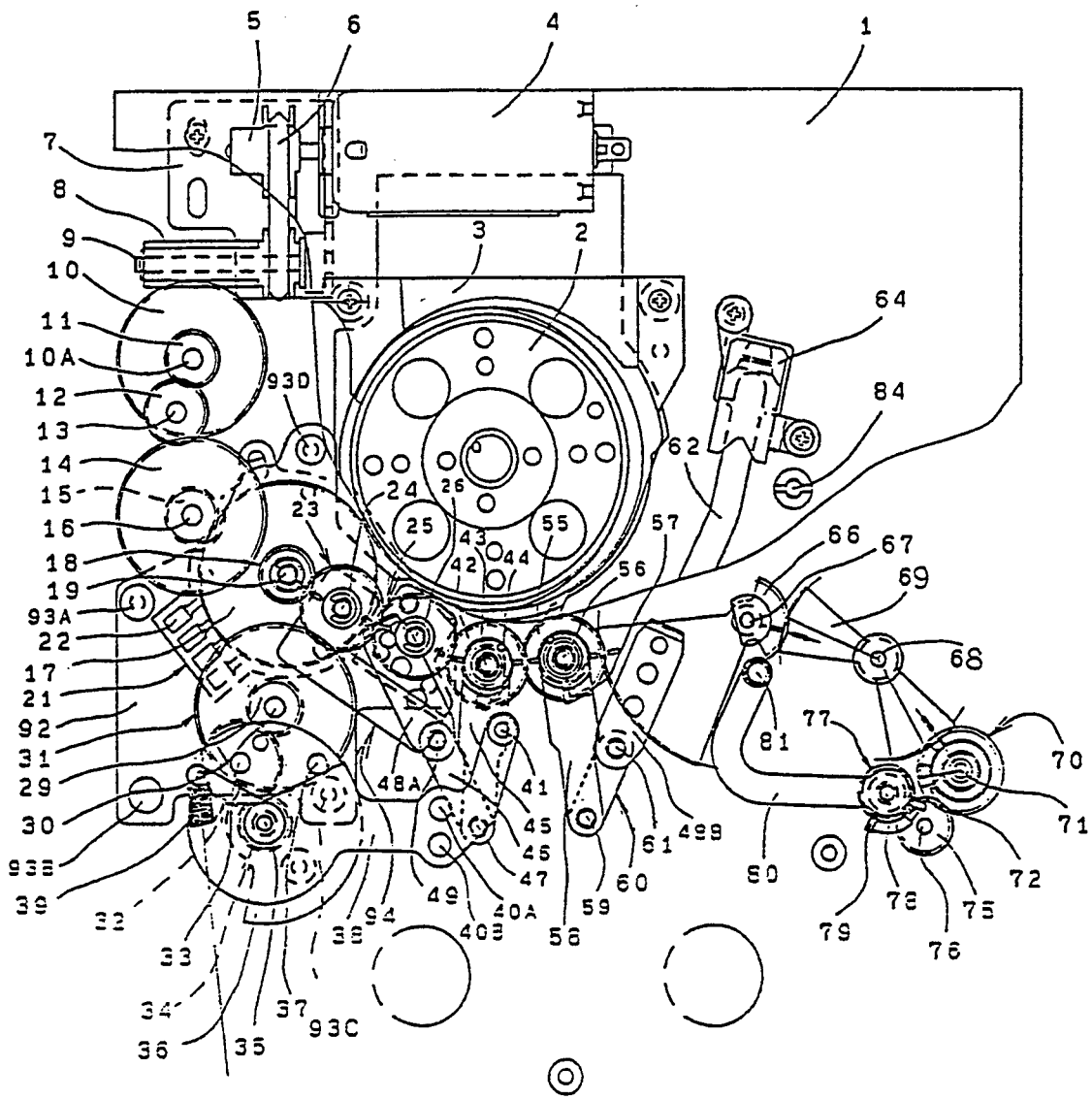
FIG. 4 is a partly cut-out top view of the loading mechanism shown in FIGS. 1, 2 or 3.
Figure 5:
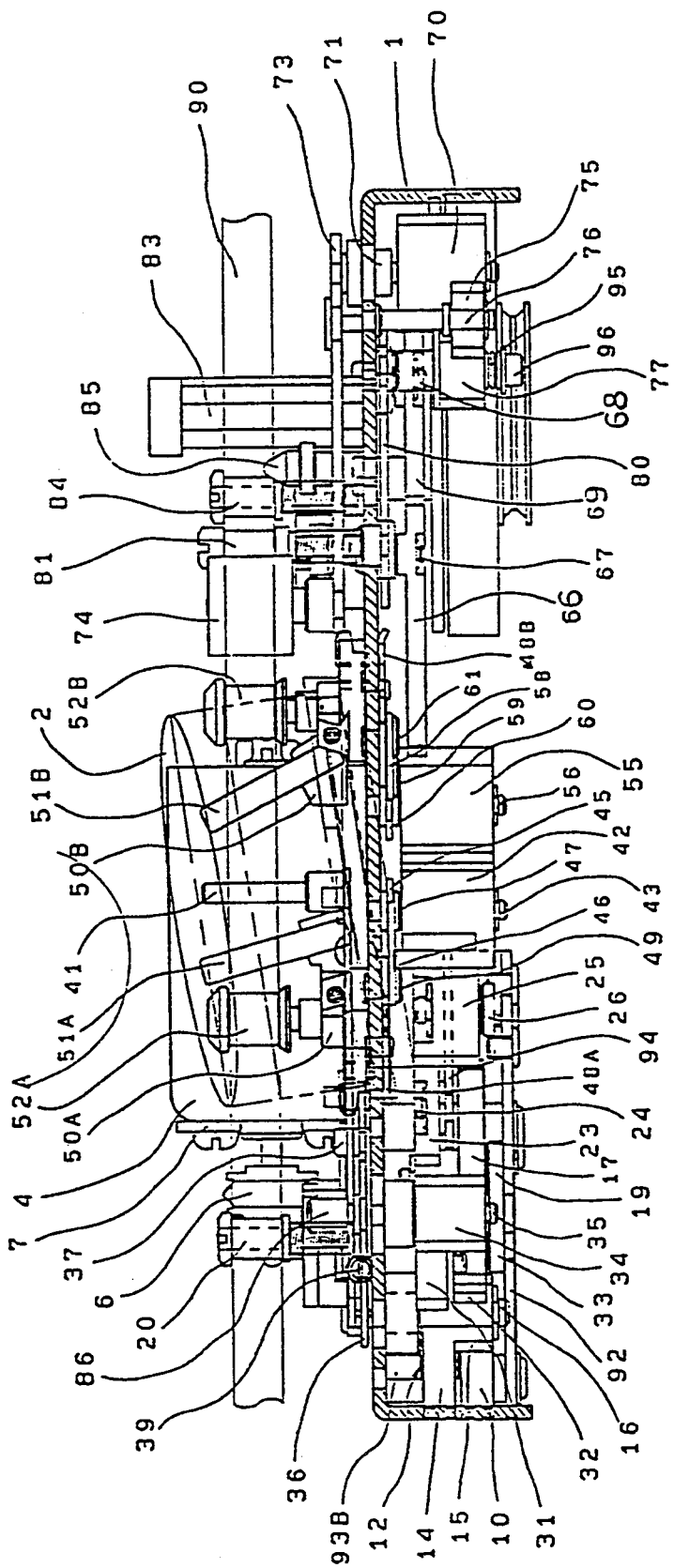
FIG. 5 is a partly sectioned, front elevational view of the loading mechanism shown in FIG. 1.

As shown in FIGS. 4 and 5, according to this invention the magnetic tape loading mechanism includes a reversible driving motor 4, a pulley 5 mounted at the end of the driving shaft of motor 4, a worm 8, a belt 6 extending between pulley 5 and worm 8, and a helical gear 10 engaged with worm 8. Coaxially mounted on shaft 11 with helical gear 10 is gear 10A which is meshed with gear 12 mounted on shaft 13. Gear 12 is then meshed with gear 14 which is also coaxially mounted on shaft 16 with gear 15, and gear 15 is further meshed with gear 17 coaxially mounted on shaft 19 with gear 18. Gear 18 is meshed with gear 24 which is meshed with both gears 25 and 29. Therefore, on the one hand, the driving force transmitted to gear 24 is transmitted to gears 42, 55 through gear 25, to gear 70 through the interfaced sector gears 66 and 69 respectively mounted on shaft 67 and 68, and to gear 77 through gears 70 and 75. On the other hand, gear 24 further transmits a driving force to gear 34 through gears 29 and 31 coaxially mounted on shaft 30 and gear 32 meshed with gear 31. It is to be noted that gears 42, 55, 34, 70 and 77 are respectively associated with left and right mounting blocks 50A and 50B, tension post 41, pinch roller 74 and moving post 81, as described hereinafter. Therefore, it is readily understood that the rotational speed of driving motor 4 is reduced through a gear train mentioned above to an appropriate speed to enable the respective controlled members to move to specified positions in accordance with an orderly time sequence set by the desired work modes.

In order to facilitate explaining and understanding the magnetic tape loading mechanism of this invention, a general description regarding the movement and positions of these members in various work modes including unloading, search and stop, and play modes is given as follows.

First, in the initial state of the unloading mode, when the magnetic tape cassette 89 is inserted into the apparatus of this invention and located in position by positioning posts 85, 86, 87, 88, the left inclination post 51A, left guide roller 52A, right inclination post 51B, right guide roller 52B, moving post 81, pinch roller 74, and tension post 41 are all located approximately linearly at the inner side of magnetic tape 90, as shown in FIG. 1. Next, after the magnetic tape detection device (not shown) detects that tape cassette 89 has been located in position, driving motor 4 will be caused to rotate by signals sent from that detection device so that the magnetic tape 90 will be led out of tape cassette 89 under the cooperation of left and right inclination posts 51A and 51B, left and right guide rollers 52A and 52B, moving post 81 and pinch roller 74, and move along a predetermined path from supply reel 91B, through left fixed post 20, left guide roller 52A, left inclination post 51A, magnetic drum 2, right inclination post 51B, right guide roller 52B, right fixed post 84, and through right moving post 81 to take-up reel 91A, as shown in FIG. 2. Such a path is the path along which the magnetic tape 90 is moved when the apparatus is in its search and stop mode. In this mode, left and right mounting blocks 50A and 50B will be driven to move along guide slots 63 and 62 until left and right guide rollers 52A and 52B are respectively brought into contact with respective guide roller positioning stoppers 65 and 64 and located in that position, such that magnetic tape 90 is stably and accurately wound around magnetic drum 2 to allow the execution of the signals recording and reproducing operations on magnetic tape 90. When the apparatus is in its search and stop mode, both tension post 41 and pinch roller 74 are not brought into contact with magnetic tape 90 and therefore the driving force of capstan shaft 83 will not be transmitted to magnetic tape 90 which is located in position and wound on magnetic drum 2 mainly due to the movement of these above members driven by the corresponding actuating mechanism to be described hereinafter. When driving motor 4 continues to rotate, the apparatus will reach to its play mode shown in FIG. 3. In this play mode, mounting blocks 50A and 50B and guide rollers 52A and 52B will remain in the same position as they are in the search and stop mode, and pinch roller 74 will move to a position to press magnetic tape 90 against capstan shaft 83 to enable the driving force of capstan shaft 83 to be transmitted to magnetic tape 90 for driving the same to move. Meanwhile, tension post 41 is also moved to press against magnetic tape 90 such that the moving magnetic tape 90 is maintained at a predetermined stretched state under the control of tension spring 39 cooperating with tension detection device 27. When the apparatus is changed from the play mode to the unloading mode, the magnetic tape is in a loose state and can be taken up onto supply reel 91B by causing the supply reel to rotate in a reverse, i.e., counterclockwise direction.

The associate arrangement between the gears 42, 55, 34, 70 and 77 and the actuated members 50A, 50B, 41, 74 and 81 and their movement in each mode will be described in detail as follows.

Figure 6:
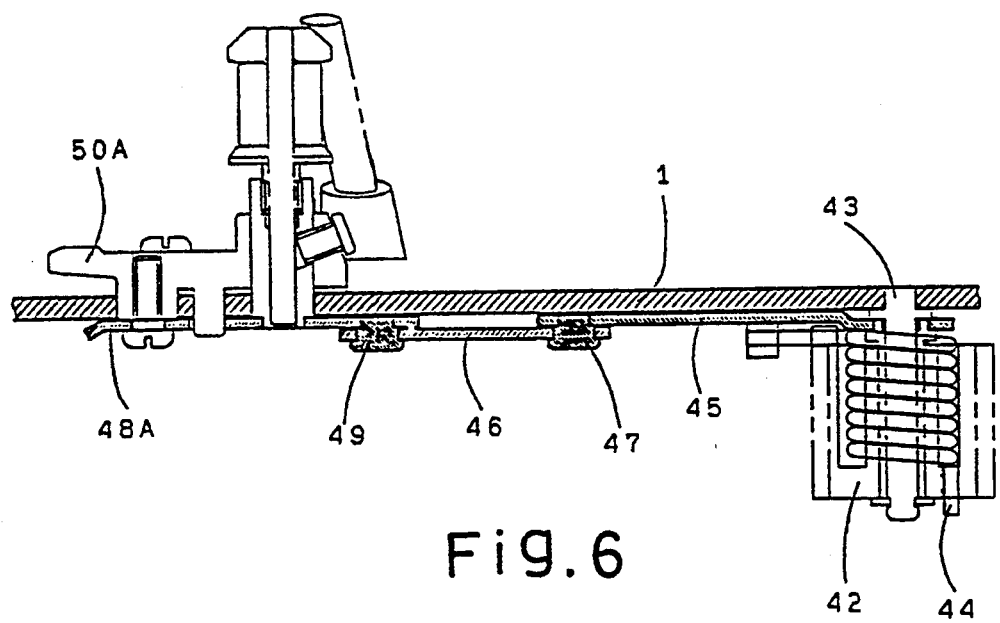
FIGS. 6 and 7 are partly sectioned, enlarged front sectional views showing the operation of the left and right inclination posts driving mechanism of the device respectively.
Figure 7:
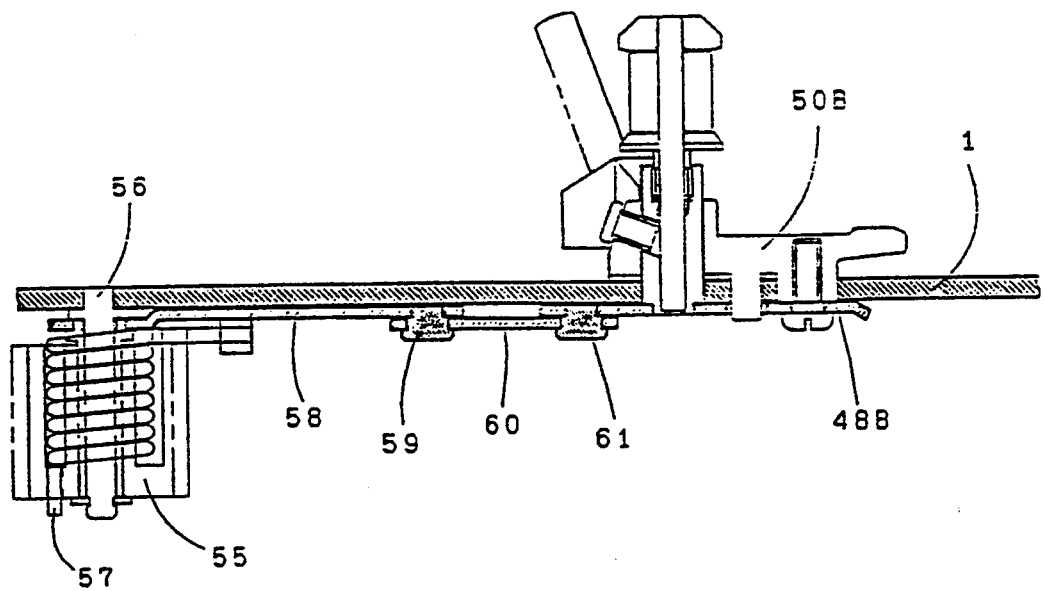

Referring to FIGS. 1–6, especially to FIGS. 4 and 6, there is shown an arrangement associated with left mounting block 50A and gear 42. Gear 42 is rotatably mounted on pivot 43 fixedly mounted on base 1. Actuating lever 45 is pivotally connected to pivot 43 at its one end and to intermediate lever 46 by means of pivot 47 at its other end. Intermediate lever 46 is further connected through pin 49 to retaining plate 48A having mounting block 50A provided thereon. Torsion spring 44 is provided around pivot 43 and received in a recess formed in gear 42 with its one extreme end fixedly connected to the bottom of gear 42 and its other extreme end engaged in actuating lever 45. Therefore, torsion spring 44 is arranged as a power transmitting medium to transmit a driving force coming from gear 42 to retaining plate 48A so as to actuate in a crank and rocker manner left mounting block 50A to move along guide slot 63 when gear 42 is rotated in one direction, i.e., in a clockwise direction. As shown in FIG. 7, there is shown an actuation mechanism between gear 55 and right mounting block 50B. As such an actuation mechanism is identical to that described above when referring to FIG. 6, and therefore its detailed description is omitted. It is also to be noted that gears 42 and 55 are meshed with and identical to each other such that the respective actuated mounting blocks 50A and 50B can be synchronously driven to keep pace with each other.

More specifically, when the apparatus proceeds from an unloading mode to a search and stop mode, gears 42 and 55 will be driven and reduced to rotate at a suitable speed by driving motor 4 through the transmission of the above gear train, to cause left and right mounting blocks 50A and 50B to move along respective guide slots 63 and 62 and locate at a predetermined position where they engage with respective positioning stoppers 65 and 64. When the apparatus proceeds from a search and stop mode to a play mode, although left and right mounting blocks 50A and 50B can not be moved further, gears 42 and 55 will continue to rotate such that torsional springs 44 and 57 will apply a rated torsional force on respective levers 45, 58, 46, 60 to cause left and right mounting blocks 50A and 50B to be positively engaged with respective positioning stoppers 65 and 64, thereby assuring that the magnetic tape 90 is moved stably. When the apparatus proceeds from a play mode to an unloading mode, driving motor 4 will then rotate in a reverse direction to cause left and right mounting blocks 50A and 50B to move back along guide slots 63 and 62 until they reach to the respective extreme ends of guide slots 63 and 62 and stop at that position.

Figure 8:
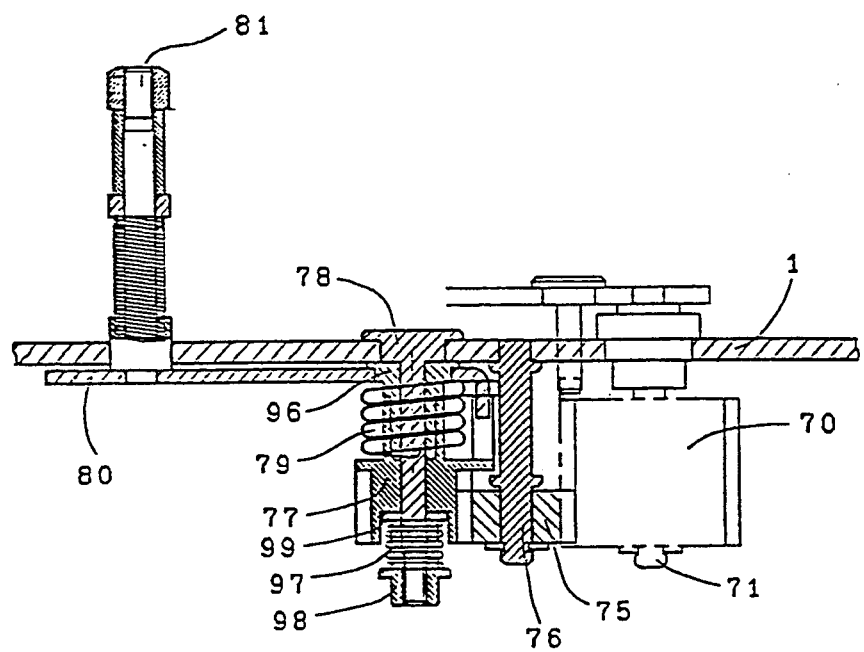
FIG. 8 is an enlarged, front sectional view showing the operation of the moving post driving mechanism of the device.
Figure 9:
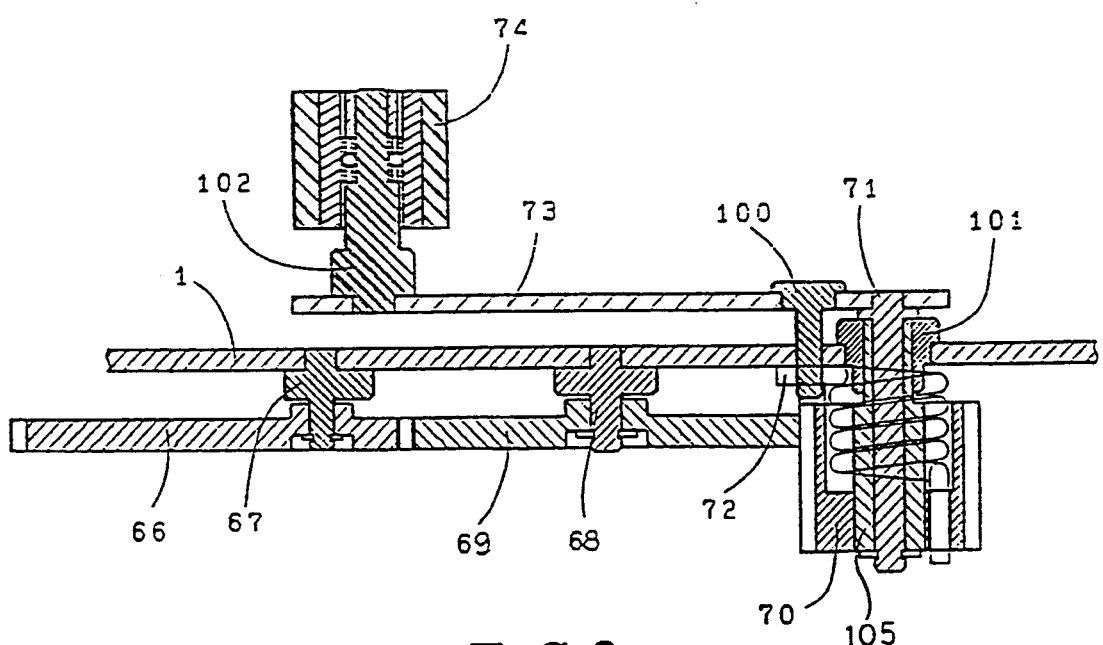
FIG. 9 is an enlarged, front sectional view showing the operation of the pinch roller driving mechanism of the device.
Figure 10A:
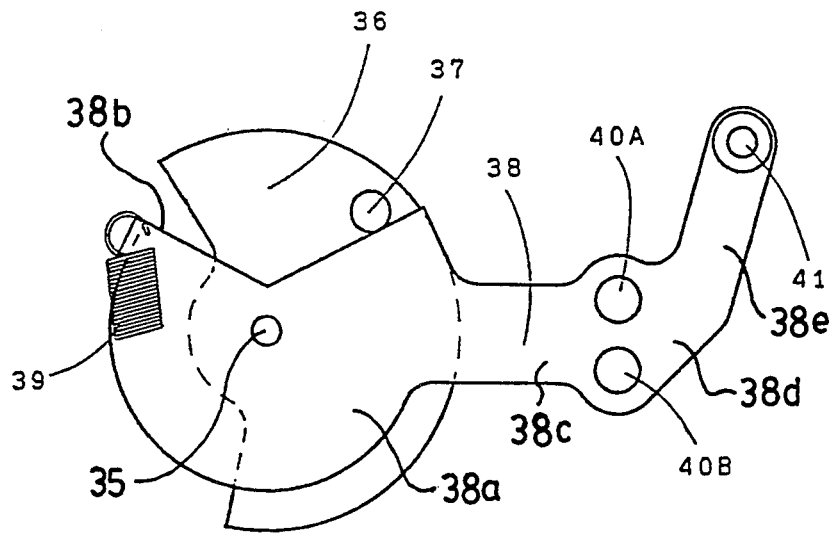
FIG. 10A is a plan view of the arrangement of the tension post.
Figure 10B:
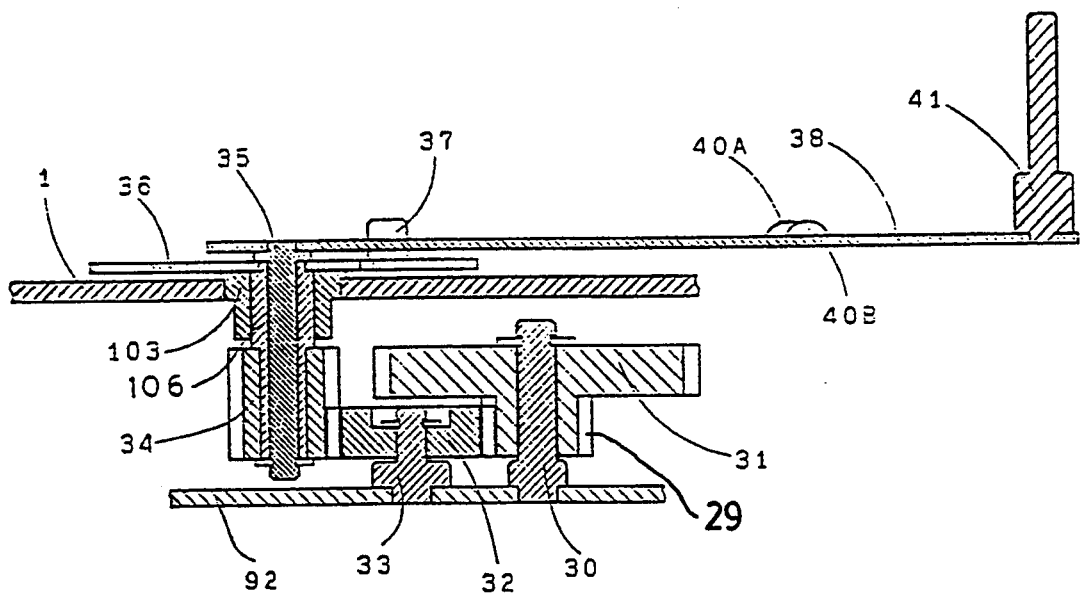
FIG. 10B is a front sectional view showing the operation of the tension post driving mechanism of the device.

Referring to FIGS. 1–3, 4 and 8, especially to FIG. 8, there is shown an arrangement between gear 77 and moving post 81. Gear 77 will be driven and reduced to rotate at a suitable speed by the gear train when motor 4 starts to rotate. The actuation mechanism includes a pivot shaft 78 fixedly mounted on base 1, a bush 96 pivotally provided around shaft 78, an actuating arm 80 fixedly connected to bush 96 at its one end and having moving post 81 mounted at its other end, a gear 77 rotatably provided around bush 96, and a torsion spring 79 mounted around the upper extension of gear 77 with its one end engaged in actuating arm 80. In such a case, torsion spring 79 is arranged as a power transmitting medium between gear 77 and actuating arm 80 such that moving post 81 will be driven to move along an arcuate slot 82 formed in base 1 when gear 77 is driven through gear 75 rotatably mounted on pivot 76 by gear 70 to rotate around pivot 78 together with bush 96.

The movement of the right moving post 81 in each work mode will be briefly described as follows. When in an unloading mode, gear 77 is driven to rotate around bush 96 by a driving force coming from driving motor 4 such that actuating arm 80 is caused to turn around pivot shaft 78 through the transmission of torsional spring 79, thereby causing moving post 81 provided thereon to move along arcuate slot 82, as shown in FIG. 1. When the apparatus proceeds to a search and stop mode, moving post 81 continues to move along slot 82 until it reaches to one extreme end of slot 82 and remains at that position shown in FIG. 2. When the apparatus continues to a play mode, although the moving post 81 can not be moved further and will locate at the same position as it is in a search and stop mode, gear 77 will continue to rotate to urge torsional spring 79 to rotate and thereby apply a rated torsional force on actuating arm 80, such that actuating arm 80 is positively located at its work position to assure that magnetic tape 90 moves stably, as shown in FIG. 3. When the apparatus proceeds from a play mode to an unloading mode, driving motor 4 will rotate in a reverse direction to allow gear 77 to drive moving post 81 to move back along slot 82 through the transmission of actuating arm 80 to the position at which moving post 81 engages again with another extreme end wall of slot 82. When moving post 81 reaches to such a position, driving motor 4 stops. Also, at the bottom of gear 77 a compression spring 97 is provided between locking nut 98 engaged at the lower threaded portion of pivot 78 and washer 99 provided beneath gear 77. Compression spring 97 will constantly and resiliently bias against gear 77 to ensure the movement accuracy of moving post 81 for allowing that magnetic tape 90 can be stably and accurately led out to a desired position.

Referring to the drawings, especially to FIGS. 1, 2, 3, 5 and 9, there is shown an mechanism for actuating pinch roller 74. This actuating mechanism includes a gear 70 rotatably mounted at the lower end of pivot 71, an actuating arm 73 pivotally mounted at its one end on the upper end of pivot 71 above base 1, a pivot shaft 102 fixedly provided at the other end of actuating arm 73 and having pinch roller 74 rotatably provided thereon, a pin 100 fixedly provided on actuating arm 73 near one end thereof and extending downwardly through an arcuate guide slot formed in base 1 (not shown), and a torsion spring 72 having its one end fixedly connected to gear 70 and its other end engaged with pin 100. Pivot 71 can be pivotally mounted on actuating arm 73 by means of bush 101 engaged into base 1, while gear 70 is fixedly mounted on pivot 70 by mean of sleeve 105. In such a case, torsion spring 72 is arranged as a power transmitting medium such that pinch roller 74 can be moved to a specified position by actuating arm 73 with which pin 100 will move together along a guide slot when gear 70 is driven to rotate together with pivot 71 by a driving force coming from driving motor 4 and transmitted through the aforementioned gear train including sector gears 66 and 69. More specifically, as shown in FIG. 2 and described above, pinch roller 74 is not yet brought into contact with capstan shaft 83 when the apparatus is in a search and stop mode. When the apparatus nearly reaches its play mode, actuating arm 73 will continue to turn to enable pinch roller 74 to press magnetic tape 90 against capstan shaft 83. At that time, actuating arm 73 is located in position as pin 100 is moved to press against the extreme end of an arcuate slot (not shown) such that pinch roller 74 can not be further moved and will remain at that work position during the period of the play mode. In the play mode, torsion spring 72 is also driven by gear 70 and will apply a rated torsional force on actuating arm 73 to assure that pinch roller 74 may maintain an appropriate acting force on magnetic tape 90 when it is located at its work position. Moreover, when the tape loading mechanism is changed from a play mode to an unloading mode, driving motor 4 is then rotated in a reverse direction to cause actuating arm 73 to swing back together with pinch roller 74 until pin 100 reaches to the extreme end of an arcuate slot. (not shown) to cause driving motor 4 to stop. Pinch roller 74 is thereby located at a work position in which the apparatus is in an unloading mode.

As to the actuation mechanism for tension post 41, it is shown in FIGS. 1–3, 5 and 10. As shown in FIGS. 10A and 10B, this mechanism includes a retaining plate 92 provided under base 1, gears 29 and 32 coaxially and fixedly mounted on pivot 30 which is rotatably mounted on retaining plate 92, a gear 34 fixedly mounted by means of sleeve 106 at the lower end of pivot 35 which is pivotally mounted in bush 103 fixedly mounted in base 1, an idler 32 interposed between gears 34 and 29 and fixedly mounted on shaft 33 pivotally mounted on retaining plate 92, an approximately semi-circular shaped disc 36 fixedly provided on the upper end of pivot 35 and located above base 1, and an actuating arm 38 pivotally mounted on the top end of pivot 35 and located above disc 36. Actuating arm 38 is an integral member and includes a body portion 38a having a notch 38b, a straight portion 38c extending from the rim of body portion 38a and having an enlarged portion 38d at the extreme end thereof, and an inclination portion 38e extending obliquely and upwardly from enlarged portion 38d as viewing perpendicularly to the drawing. These portions extend coplanarly, and the tension post 41 is fixedly provided at the end of inclination portion 38e. The tension post 41 can be rotated by actuating arm 38. At the enlarged portion 38d a pair of magnets 40A and 40B are provided which constitute a magnetic tape tension detection device together with a magnetic impedance sensor 27 fixedly provided on base 1 and opposite to these magnets 40A and 40B. The detection device may send signals produced due to the interaction between magnets 40A, 40B and sensor 27 to a controller (not shown) for controlling the rotational speed of the motor for driving supply reel 91B to keep the magnetic tape 90 stretched at a constant tension when moved, as will be described in detail hereinafter. Also, a tension spring 39 is provided between the corner of notch portion 38b and the left bottom corner of base 1 (FIG. 1), and is so arranged that a spring force is applied on actuating arm 38 to cause the same to turn counterclockwise as viewing perpendicularly to the drawings. It is to be noted that such a counterclockwise turning movement is normally prohibited by a stopper pin 37 provided on disc 36, as clearly shown in FIG. 10A.

More specifically, before the apparatus is in a search and stop mode, tension spring 39 is always in a stretched state and actuating arm 38 is prevented from turning counterclockwise due to the engagement between the stopper pin 37 on disc 36 and the notch portion 38b of actuating arm 38 even a spring force produced by spring 39 is constantly applied on actuating arm 38 to cause the same to turn counterclockwise. When the apparatus is in a search and stop mode, gear 34 will be driven to rotate counterclockwise by driving motor 4 to cause disc 36 to turn. In response thereto, actuating arm 38 is gradually released as it is rotated along with disc 36, and tension post 41 is moved toward magnetic tape 90 by the turning movement of arm 38. However, in this mode, tension post 41 is not brought into contact with magnetic tape 90 and is still under the control of gear 34 since stopper pin 37 is still in engagement with the notch portion 38b of actuating arm 38, as shown in FIG. 2. When in a play mode, gear 34 will be rotated to a position to bring tension post 41 into contact with magnetic tape 90, as shown in FIG. 3. And accordingly, disc 36 is also turned to a position to enable stopper pin 37 to disengage from notch portion 38b of actuating arm 38. In such a case, the magnitude of the tension of magnetic tape 90 is controlled by the expansion and contraction of spring 39. Namely, when magnetic tape 90 has a too large tension, magnetic tape 90 will press against tension post 41 to cause actuating arm 38 to turn clockwise, such that magnet 40A on arm 38 will interact with sensor 27 on base 1 to send a signal to a controller (not shown) for controlling the rotational speed of the supply reel driving motor (not shown), thereby lowering the tension of magnetic tape 90. On the contrary, if magnetic tape 90 has a too small tension, tension post 41 will then press further against magnetic tape 90 as actuating arm 38 is turned counterclockwise by the action of spring 39. In connection thereto, magnet 40B on arm 38 will interact with sensor 27 on base 1 to send a signal for adjusting the rotational speed of the supply reel driving motor to increase the tension of magnetic tape 90. In this way, tension post 41 is constantly maintained at a proper position to enable magnetic tape 90 to have an optimum tension. When the apparatus proceeds from a play mode to an unloading mode, driving motor 4 will rotate in a reverse direction to cause gear 34 to rotate clockwise to enable stopper pin 37 to be again in engagement with actuating arm 38 and move the same back to its initial position when in an unloading mode.

Figure 11:
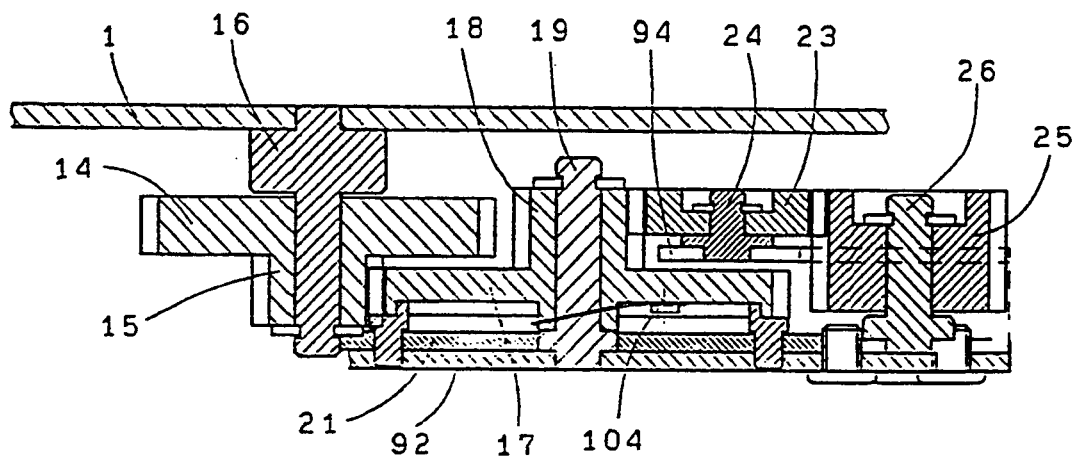
FIG. 11 is an enlarged, front sectional view showing the arrangement of the work mode setting device.

Finally, the switchable device for establishing the various work modes is described below. As shown in FIGS. 4 and 11, such a device includes a positional detector 21 having a plurality of position sensors 22 mounted on retaining plate 92 and opposite to the bottom of gear 17, and a contact slider 104 attached to the bottom of gear 17. Contact slider 104 is so arranged as to be in contact with the respective sensors 22 according to the respective turning angles of gear 17 in each work mode, such that detector 21 may send, after it has detected the variation of the turning angle of gear 17, a signal to a controller (not shown) for controlling the rotation and rotational direction of driving motor 4 to enable the respective members of the magnetic tape loading mechanism of this invention to move to a predetermined position in accordance with the preset time sequence, thereby establishing the various work modes described above.

With the arrangement described above, it is readily understood that the magnetic tape loading mechanism of this invention may provide the following advantages:

1. In the gear train, gear pairs are coaxially provided and the members are all appropriately arranged, which leads to an effective utilization of the space, ease of assembly and maintenance, a light weight, a miniaturization of apparatus, a compact design, the prevention of the interference between components, a reduction in the amount of components and thus a lower manufacturing cost.

2. Each driving gear operatively connected to the respective members for controlling the magnetic tape works in cooperation with a spring and the spring apply a rated torsional force on respective members, which aids in maintaining the positional accuracy of the respective members in each work mode and in preventing the time sequence by which the respective members may reach to their work positions in order from impedance and interference.

3. The accuracy and stability of the movement of the respective members of the mechanism is enhanced due to the positive drive of gears. With this arrangement, it enables the magnetic tape can be stably and accurately led out to a desired position. The execution of the signals recording and reproducing operations on magnetic tape can be achieved with a high accuracy.

We claim:

1. A magnetic tape loading mechanism for loading a tape contained in a tape cassette inside a magnetic recording and/or reproducing apparatus, said loading mechanism comprising a base, a magnetic head having a magnetic drum which is rotatably mounted on said base, a guide slot formed on said base, a pair of first and second mounting blocks each being movable along said guide slot, an inclination post provided on said guide slot which enables said tape to move at an accurate rotational angle along said inclination post and prevents said tape from twisting, a guide roller for guiding and changing a direction of said tape and adjusting and limiting the vibration of said tape, a moving post for leading said tape out of said tape cassette and for guiding said tape, a pinch roller for controlling movement of said tape, a tension post for adjusting tension of said tape, a reversible driving motor for providing a driving force, a first gear train comprising a plurality of transmission gears for transmitting the driving force from said driving motor and for reducing the rotational speed derived from said driving motor, and a capstan shaft for transmitting the driving force to said tape;

wherein the improvement being characterized in that said loading mechanism further comprising a second gear train connected to said first gear train which causes a plurality of actuated members to be actuated and disposed in appropriate predetermined positions in said apparatus in accordance with various work modes of said loading mechanism, said actuated members comprising said pair of mounting blocks, said pinch roller, said moving post, and said tension post; and said second gear train comprising:

a first actuating gear meshed with a first transmission gear of said first gear train and operatively connected to said first mounting block;

a second actuating gear being identical in dimension to said first actuating gear and meshed therewith, said second actuating gear being operatively connected to said second mounting block;

a third actuating gear being adapted to receive a rotational force from said second actuating gear and operatively connected to said pinch roller:

a fourth actuating gear being adapted to receive a rotational force from said third actuating gear and operatively connected to said moving post; and a fifth actuating gear being adapted to receive a rotational force from a second transmission gear of said first gear train and operatively connected to said tension post;

wherein said work modes of said cassette comprising an unloading mode, a search and stop mode, and a play mode, and in said unloading mode, said inclination posts, said guide rollers, said pinch rollers, said moving post and said tension post are all disposed within said tape and extending between a supply wheel and a take-up wheel of said cassette, in said search and stop mode, said actuated members are actuated by said second train to move to respective predetermined positions to cooperatively cause said tape to be led out of said tape cassette, wound around said magnetic drum, and extended along a predetermined path between said supply and take-up wheels, and in said play mode, said pinch roller is further moved to press said tape against said capstan shaft thereby allowing said tape to be driven by said capstan shaft, and said tension post is also moved to be in contact with said tape for controlling a tension of said tape;

said magnetic tape loading mechanism further comprising an actuating mechanism operatively connected between said fifth actuating gear and said tension post, said fifth actuating mechanism comprising a turn disc and an actuating arm, both of which being fixedly mounted on a pivot shaft for mounting said fifth actuating gear, said actuating arm having first and second ends and said actuating arm being connected to said pivot shaft at said first end thereof, said turn disc containing a stopper pin which prevents said actuating arm from turning even when a spring force is constantly applied on said actuating arm, wherein when said turn disc is synchronously moved by said fifth actuating gear, said actuating arm is gradually released as it is rotated along with said turn disc, and said tension is also biased by a extension spring to turn in one direction to allow said tension post provided on said second end thereof to be brought into contact with said tape when said fifth actuating gear is driven to cause said turn disc to rotate to a position for disengaging said stopper pin provided on said disc from said actuating arm during said play mode.

2. A magnetic tape loading mechanism as recited in claim 1, wherein said loading mechanism further comprising a first and a second actuating mechanisms operatively and respectively connected between said first actuating gear and said first mounting block, and between said second actuating gear and said second mounting block, said first and second actuating gears are identical to and meshed with each other for allowing said first and second mounting blocks to be synchronously moved, each of said pair of mounting blocks being movable along a guide slot for loading and unloading said magnetic tape toward and away from said rotatable drum, and each of said first and second actuating mechanisms includes a torsion spring for applying a rated spring force on said respective mounting blocks to allow said mounting blocks to be positively engaged with respective positioning stoppers located at one extreme end of said guide slot and to reliably bring said magnetic tape into and out of a sliding contact with said magnetic drum for recording and reproducing information with detail signals when said apparatus is in said play mode.

3. A magnetic tape loading mechanism as recited in claim 1, wherein said loading mechanism further comprising a third and a fourth actuating mechanism operatively and respectively connected between said third actuating gear and said pinch roller, and between said fourth actuating gear and said moving post;

said third actuating mechanism comprising a pair of sector gears meshed with each other and interposed between said second and third actuating gears to also mesh respectively therewith, said third actuating mechanism further comprising an actuating arm supporting said pinch roller and adapted to be driven by said third actuating gear to enable said pinch roller to be engaged with said capstan shaft;

each of said third and fourth actuating mechanisms further comprising a torsion spring, which is arranged so as to act as a power transmitting medium and to apply a rated spring force on said pinch roller and said moving post to keep said pinch roller and said moving post at respectively predetermined positions when said apparatus is in said play mode.

4. A magnetic tape loading mechanism as recited in claim 1, wherein said actuating arm comprises a pair of magnets provided thereon which are capable of energizing a magnetic impedance sensor provided on said base to send signals to a controller for controlling the speed of a motor for driving said supply reel in accordance with the tension of said tape sensed by said tension post.

5. A magnetic tape loading mechanism as recited in claim 1, wherein said actuating arm comprises a pair of magnets provided thereon which are capable of energizing a magnetic impedance sensor provided on said base to send signals to a controller for controlling the speed of a motor for driving said supply reel in accordance with the tension of said tape sensed by said tension post.

6. A magnetic tape loading mechanism as recited in claim 1, which further comprising a positional detector which includes a contact slider attached to a transmission gear of said first gear train proceeding said second gear train said contact slider being capable of contacting one of a plurality of position sensors provided on a retaining plate located below said base for sending signals to a controller for actuating and controlling the direction of rotation of said driving motor to initiate one of said work modes in accordance with a turning angle of said transmission gear.

7. A magnetic tape loading mechanism for loading a tape contained in a tape cassette inside a magnetic recording and/or reproducing apparatus, said loading mechanism comprising a base, a magnetic head having a magnetic drum which is rotatably mounted on said base, a guide slot formed on said base, a pair of first and second mounting blocks each being movable along said guide slot, an inclination post provided on said guide slot which enables said tape to move at an arcuate rotational angle along said inclination post and prevents said tape from twisting, a guide roller for guiding and changing a direction of said tape and adjusting and limiting the vibration of said tape, a moving post for leading said tape out of said tape cassette and for guiding said tape, a pinch roller for controlling movement of said tape, a tension post for adjusting tension of said tape, a reversible driving motor for providing a driving force, a first gear train comprising a plurality of transmission gears for transmitting the driving force from said driving motor and for reducing the rotational speed derived from said driving motor, and a capstan shaft for transmitting the driving force to said tape.

wherein the improvement being characterized in that said loading mechanism further comprising a second gear train connected to said first gear train which causes a plurality of actuated members to be actuated and disposed in appropriate predetermined positions in said apparatus in accordance with various work modes of said loading mechanism, said actuated members comprising said pair of mounting blocks, said pinch roller, said moving post, and said tension post; and said second gear train comprising:

a first actuating gear meshed with a first transmission gear of said first gear train and operatively connected to said first mounting block;

a second actuating gear being identical in dimension to said first actuating gear and meshed therewith, said second actuating gear being operatively connected to said second mounting block;

a third actuating gear being adapted to receive a rotational force from said second actuating gear and operatively connected to said pinch roller;

a fourth actuating gear being adapted to receive a rotational force from said third actuating gear and operatively connected to said moving post; and a fifth actuating gear being adapted to receive a rotational force from a second transmission gear of said first gear train and operatively connected to said tension post;

wherein said work modes of said cassette comprising an unloading mode, a search and stop mode, and a play mode, and in said unloading mode, said inclination posts, said guide rollers, said pinch rollers, said moving post and said tension post are all disposed within said tape and extending between a supply wheel and a take-up wheel of said cassette, in said search and stop mode, said actuated members are actuated by said second train to move to respective predetermined positions to cooperatively cause said tape to be led out of said tape cassette, wound around said magnetic drum, and extended along a predetermined path between said supply and take-up wheels, and in said play mode, said pinch roller is further moved to press said tape against said capstan shaft thereby allowing said tape to be driven by said capstan shaft, and said tension post is also moved to be in contact with said tape for controlling a tension of said tape, said loading mechanism further comprising a first and a second actuating mechanisms operatively and respectively connected between said first actuating gear and said first mounting block, and between said second actuating gear and said second mounting block, said first and second actuating gears are identical to and meshed with each other for allowing said first and second mounting blocks to be synchronously moved, each of said pair of mounting blocks being movable along a guide slot for loading and unloading said magnetic tape toward and away from said rotatable drum, and each of said first and second actuating mechanisms includes a torsion spring for applying a rated spring force on said respective mounting blocks to allow said mounting blocks to be positively engaged with respective positioning stoppers located at one extreme end of said guide slot and to reliably bring said magnetic tape into and out of a sliding contact with said magnetic drum for recording and reproducing information with detail signals when said apparatus is in said play mode;

a third and a fourth actuating mechanism operatively and respectively connected between said third and actuating gear and said pinch roller, and between said fourth actuating gear and said moving post;

said third actuating mechanism comprising a pair of sector gears meshed with each other and interposed between said second and third actuating gears to also mesh respectively therewith, said third actuating mechanism further comprising an actuating arm supporting said pinch roller and adapted to be driven by said third actuating gear to enable said pinch roller to be engaged with said adapted to be driven by said third actuating gear to enable said pinch roller to be engaged with said capstan shaft;

each of said third and fourth actuating mechanisms further comprising a torsion spring, which is arranged so as to act as a power transmitting medium and to apply a rated spring force on said pinch roller and said moving post to keep said pinch roller and said moving post at respectively predetermined positions when said apparatus is in said play mode; and a fifth actuating mechanism operatively connected between said fifth actuating gear and said tension post, said fifth actuating mechanism comprising a turn disc and an actuating arm, both of which being fixedly mounted on a pivot shaft for mounting said fifth actuating gear, said actuating arm having first and second ends and said actuating arm being connected to said pivot shaft at said first end thereof, said turn disc containing a stopper pin which prevents said actuating arm from turning even when a spring force is constantly applied on said actuating arm, wherein when said turn disc is synchronously moved by said fifth actuating gear, said actuating arm is gradually released as it is rotated along with said turn disc, and said tension post is moved to touch said tape to control an optimum tension on said tape, said actuating arm is also biased by a extension spring to turn in one direction to allow said tension post provided on said second end thereof to be brought into contact with said tape when said fifth actuating gear is driven to cause said turn disc to rotate to a position for disengaging said stopper pin provided on said disc from said actuating arm during said play mode.

8. A magnetic tape loading mechanism for loading a tape contained in a tape cassette inside a magnetic recording and/or reproducing apparatus, said loading mechanism comprising a base, a magnetic head having a magnetic drum which is rotatably mounted on said base, a guide slot formed on said base, a pair of first and second mounting blocks each being movable along said guide slot, an inclination post provided on said guide slot which enables said tape to move at an accurate rotational angle along said inclination post and prevents said tape from twisting, a guide roller for guiding and changing a direction of said tape and adjusting and limiting the vibration of said tape, a moving post for leading said tape out of said tape cassette and for guiding said tape, a pinch roller for controlling movement of said tape, a tension post for adjusting tension of said tape, a reversible driving motor for providing a driving force, a first gear train comprising a plurality of transmission gears for transmitting the driving force from said driving motor and for reducing the rotational speed derived from said driving motor, and a capstan shaft for transmitting the driving force to said tape;

wherein the improvement being characterized in that said loading mechanism further comprising a second gear train connected to said first gear train which causes a plurality of actuated members to be actuated and disposed in appropriate predetermined positions in said apparatus in accordance with various work modes of said loading mechanism, said actuated members comprising said pair of mounting blocks, said pinch roller, said moving post, and said tension post; and said second gear train comprising:

a first actuating gear meshed with a first transmission gear of said first gear train and operatively connected to said first mounting block;

a second actuating gear being identical in dimension to said first actuating gear and meshed therewith, said second actuating gear being operatively connected to said second mounting block;

a third actuating gear being adapted to receive a rotational force from said second actuating gear and operatively connected to said pinch roller;

a fourth actuating gear being adapted to receive a rotational force from said third actuating gear and operatively connected to said moving post; and a fifth actuating gear being adapted to receive a rotational force from a second transmission gear of said first gear train and operatively connected to said tension post;

wherein said work modes of said cassette comprising an unloading mode, a search and stop mode, and a play mode, and in said unloading mode, said inclination posts, said guide rollers, said pinch rollers, said moving post and said tension post are all disposed within said tape and extending between a supply wheel and a tape-up wheel of said cassette, in said search and stop mode, said actuated members are actuated by said second train to move to respective predetermined positions to cooperatively cause said tape to be led out of said tape cassette, wound around said magnetic drum, and extended along a predetermined path between said supply and take-up wheels, and in said play mode, said pinch roller is further moved to press said tape against said capstan shaft thereby allowing said tape to be driven by said capstan shaft, and said tension post is also moved to be in contact with said tape for controlling a tension of said tape;

said magnetic tape loading mechanism further comprising:

a first and a second actuating mechanisms operatively and respectively connected between said first actuating gear and said first mounting block, and between said second actuating gear and said mounting block, said first and second actuating gears are identical to and meshed with each other for allowing said first and second mounting blocks to be synchronously moved, each of said pair of mounting blocks being movable along a guide slot for loading and unloading said magnetic tape toward and away from said rotatable drum, and each of said first and second actuating mechanisms includes a torsion spring for applying a rated spring force on said respective mounting blocks to allow said mounting blocks to be positively engaged with respective positioning stoppers located at one extreme end of said guide slot and to reliably bring said magnetic tape into and out of a sliding contact with said magnetic drum for recording and reproducing information with detail signals when said apparatus is in said play mode; and a fifth actuating mechanism operatively connected between said fifth actuating gear and said tension post, said fifth mechanism comprising a turn disc and an actuating arm, both of which being fixedly mounted on a pivot shaft for mounting said fifth actuating gear, said actuating arm having first and second ends and said actuating arm being connected to said pivot shaft at said first end thereof, said turn disc containing a stopper pin which is adapted to prevent said actuating arm from turning even when a spring force is constantly applied on said actuating arm, wherein when said turn disc is synchronously moved by said fifth actuating gear, said actuating arm is gradually released as it is rotated along with said turn disc, and said tension post is moved to touch said tape to control an optimum tension on said tape, said actuating arm is also biased by a extension spring to turn in one direction to allow said tension post provided on said second end thereof to be brought into contact with said tape when said fifth actuating gear is driven to cause said turn disc to rotate to a position for disengaging said stopper pin provided on said disc from said actuating arm during said play mode.

* * * * *